United States Patent [19]
Seneker et al.

[11] Patent Number: 5,962,619
[45] Date of Patent: Oct. 5, 1999

[54] PROCESS FOR MAKING CLEAR POLYURETHANE/UREA ELASTOMERS

[75] Inventors: Stephen D. Seneker, Sissonville; Chin-Chang Shen, Charleston, both of W. Va.

[73] Assignee: ARCO Chemical Technology, L.P., Greenville, Del.

[21] Appl. No.: 09/039,964

[22] Filed: Mar. 16, 1998

[51] Int. Cl.⁶ .......... C08G 18/10; C08G 18/32; C08G 18/75; C08G 18/76
[52] U.S. Cl. .......... 528/64; 152/151; 301/5.3; 528/67; 528/906
[58] Field of Search .......... 528/64, 67, 906; 301/5.3; 152/151

[56] References Cited

U.S. PATENT DOCUMENTS

| | | | |
|---|---|---|---|
| 3,115,481 | 12/1963 | Pigott et al. | 528/44 |
| 3,997,514 | 12/1976 | Kogon | 528/64 |
| 4,146,688 | 3/1979 | Schwindt et al. | 521/159 |
| 4,263,423 | 4/1981 | Schwindt et al. | 528/55 |
| 4,404,353 | 9/1983 | Slagel | 528/67 |
| 4,631,298 | 12/1986 | Presswood | 521/163 |
| 4,808,690 | 2/1989 | Slagel | 528/60 |
| 5,116,931 | 5/1992 | Reisch et al. | 528/59 |
| 5,136,010 | 8/1992 | Reisch et al. | 528/75 |
| 5,158,922 | 10/1992 | Hinney et al. | 502/175 |
| 5,223,599 | 6/1993 | Gajewski | 528/59 |
| 5,470,813 | 11/1995 | Le-Khac | 502/175 |
| 5,482,908 | 1/1996 | Le-Khac | 502/156 |
| 5,589,431 | 12/1996 | Le-Khac | 502/175 |
| 5,646,230 | 7/1997 | Pantone et al. | 528/64 |
| 5,670,601 | 9/1997 | Allen et al. | 528/76 |
| 5,677,413 | 10/1997 | Barksby et al. | 528/65 |
| 5,696,221 | 12/1997 | Barksby et al. | 528/64 |
| 5,728,745 | 3/1998 | Allen et al. | 521/159 |
| 5,849,944 | 12/1998 | Allen et al. | 560/26 |

*Primary Examiner*—Rabon Sergent
*Attorney, Agent, or Firm*—Jonathan L. Schuchardt

[57] ABSTRACT

A process for making clear elastomers is disclosed. First, a polyol having a narrow molecular weight distribution (Mw/Mn<1.5) reacts an aromatic diisocyanate at an NCO/OH ratio from about 1.3 to about 3.0 to give a non-viscous isocyanate-terminated prepolymer. A mixture that contains this prepolymer and an aliphatic diisocyanate is then reacted with an aromatic diamine to give a clear elastomer. The elastomers have excellent overall physical and mechanical properties, including resilience greater than 55%. The elastomers are valuable for in-line skates and other applications for which clarity is important.

27 Claims, No Drawings

PROCESS FOR MAKING CLEAR POLYURETHANE/UREA ELASTOMERS

FIELD OF THE INVENTION

The invention relates to polyurethane elastomers. In particular, the invention relates to a process for making clear polyurethane/urea elastomers that have good dynamic properties, particularly high resilience. These elastomers are especially valuable in the manufacture of wheels for in-line skates.

BACKGROUND OF THE INVENTION

In-line skate wheels require elastomers having excellent resilience (rebound), which prevents the wheels from overheating or even melting during use. In addition, highly resilient wheels roll more easily, so they require less effort from the skater.

High-performance polyurethane cast elastomers (typically made from MDI, polytetramethylene ether glycol (PTMEG), and 1,4-butanediol) are currently the material of choice for in-line skate wheels. The best (and usually the most expensive) elastomers use PTMEG and have resiliences of 70–80%. Less expensive elastomers can be made with polyester polyols or polyoxypropylene diols (PPGs) instead of PTMEG, but these have significantly lower resilience. For example, a typical elastomer based on conventional PPGs has a resilience of only 50–55%. The industry would benefit from inexpensive elastomers having high resilience.

Opaque skate wheels are spinning out of favor with skaters and skateboarders. Like baggy jeans and heavy metal, clear wheels are "in." Skaters just like the looks of transparent wheels. Unfortunately, to make clear wheels, formulators usually have to make composition changes that sacrifice resilience and other key elastomer properties. Preferably, clear elastomers could be made without hurting performance.

Polyurethane elastomers, in the purest sense, use diol chain extenders and have urethane (—O—CO—NH—) groups but do not have urea (—NH—CO—NH—) groups. In contrast, polyurethane/urea elastomers, because they are made with diamine chain extenders (usually an aromatic diamine), have both urethane and urea groups. So far, polyurethane/urea elastomers have not significantly penetrated the in-line skate market. This is probably because the high viscosities of prepolymers based on PTMEG or polyester polyols make the elastomers hard to process and prevent formulators from easily reaching the targeted hardness.

Recently issued U.S. Pat. No. 5,646,230 summarizes various approaches now used in the field to make polyurethane/urea elastomers and identifies some important concerns. For example, it cites U.S. Pat. No. 3,115,481 to illustrate that isocyanate-terminated prepolymers made from aromatic diisocyanates are usually too reactive with aromatic diamine chain extenders to allow processing of cast elastomers. U.S. Pat. No. 3,997,514 resolves the reactivity problem by making hydroxy-terminated prepolymers from an excess of glycol (e.g., PTMEG) and aromatic diisocyanate. The hydroxy-terminated prepolymer is then reacted with an aliphatic diisocyanate to make an aliphatic diisocyanate-terminated prepolymer that has more controlled, reduced reactivity with aromatic diamines.

In contrast, the '230 patent teaches to make aliphatic diisocyanate-terminated prepolymers by reacting, preferably in a single step, a polyether polyol (PPGs or PTMEG), an aromatic diisocyanate, and an aliphatic diisocyanate. These prepolymers are then chain extended with aromatic diamines. While both the aromatic and aliphatic diisocyanates react into the prepolymer, the aromatic diisocyanate reacts faster so the terminal NCO groups derive primarily from the aliphatic diisocyanate. A relatively large proportion (compared with the amount of aromatic diisocyanate) of the more-expensive aliphatic diisocyanate is used. Missing from the '230 patent is any discussion of how to make clear elastomers while maintaining the high resilience needed for high-quality, in-line skate wheels.

In sum, the high-performance elastomer market would benefit from improved elastomers. Of particular value is a way to make the clear elastomers now in vogue without sacrificing important mechanical properties. Preferably, the elastomers could be made from readily available materials that are listed under the Toxic Substances Control Act (TSCA). Preferably, the process used to make them would avoid the reactivity problems of aromatic diisocyanate-terminated prepolymers and the viscosity issues of prepolymers made from PTMEG and polyester polyols. An ideal process would give clear, low-cost elastomers with an excellent overall balance of properties, particularly high resilience.

SUMMARY OF THE INVENTION

The invention provides a path to clear elastomers that meet the demanding dynamic property requirements of in-line skates. In particular, the invention is a process for making clear polyurethane/urea elastomers. The process comprises three steps. First, a polyol reacts with an aromatic diisocyanate to give an isocyanate-terminated prepolymer. The polyol has a polydispersity (Mw/Mn) less than about 1.5. The NCO/OH mole ratio used is within the range of about 1.3 to about 3.0. Next, the resulting prepolymer is mixed with an aliphatic diisocyanate to form a prepolymer/aliphatic diisocyanate mixture that has an NCO content within the range of about 2 to about 13 wt. %. In the third step, this prepolymer/aliphatic diisocyanate mixture reacts with an aromatic diamine in an amount and manner effective to produce the clear elastomer.

We surprisingly found that getting clear elastomers does not have to mean compromising physical properties. By reacting a mixture of a particular prepolymer/aliphatic diisocyanate mixture with a common aromatic diamine chain extender, we made clear elastomers with excellent overall physical and mechanical properties, particularly resilience greater than 55% at 80A Shore hardness. Surprisingly, the process of the invention gives clear, resilient elastomers even at Shore hardnesses well in excess of 80A, which is hard to do with current know-how. Moreover, the process of the invention avoids the high-viscosity prepolymers that have, until now, limited formulators of polyurethane/urea elastomers.

DETAILED DESCRIPTION OF THE INVENTION

The invention is a three-step process for making clear polyurethane/urea elastomers. In the first step, an aromatic diisocyanate reacts with a polyether polyol to give an isocyanate-terminated prepolymer.

Aromatic diisocyanates suitable for use in the invention are those well known in the polyurethane elastomer art. Examples include 2,4- and 2,6-toluene diisocyanates and mixtures of these isomers (TDIs), diphenylmethane diisocyanates (MDIs), TDIs and MDIs modified with carbodiimide, urethane, allophanate, isocyanurate, urea, or biuret groups, phenylene diisocyanates, naphthalene diisocyanates, and the like, and mixtures thereof. Other suitable examples are found in U.S. Pat. Nos. 5,646,230 and 3,997,514, the teachings of which are incorporated herein by reference. Preferred aromatic diisocyanates are commercially available TDIs and MDIs, such as TDI-80 (which contains 80% of 2,4-toluene diisocyanate and 20% of 2,6-toluene diisocyanate), pure 2,4-TDI, and MONDUR ML (50% 4,4'-MDI plus 50% of MDI isomers other than 4,4'-MDI, product of Bayer Corporation). When MDIs are used, it is preferred to use an MDI that has at least about 15 wt. % of MDI isomers other than 4,4'-MDI. As Table 3 shows, potlife can become too short if the level of 4,4'-MDI in the elastomer system exceeds about 90 wt. %.

Suitable polyols are well known in the art, and include polyether polyols, polyester polyols, polycarbonate polyols, and the like. Polyether polyols are preferred. Suitable polyether polyols are commonly made by polymerizing one or more cyclic ethers, such as epoxides (e.g., ethylene oxide, propylene oxide), oxetanes, oxolanes (e.g., tetrahydrofuran), or the like, in the presence of water or an alcohol starter. The polyols are made using any suitable catalyst, including, for example, potassium hydroxide (KOH), boron trifluoride, or a double metal cyanide (DMC) catalyst. DMC catalysts are preferred because they easily give polyether polyols with exceptionally low unsaturation or monol content. The polyols can be homopolymers (e.g., polyoxypropylene diols), random copolymers of two or more cyclic ethers (e.g., a random copolymer of propylene oxide and ethylene oxide), block copolymers (e.g., a polyoxypropylene core with a polyoxyethylene cap), "tipped" copolymers (e.g., Polyol F described below), or the like.

Polyols useful in the invention have narrow molecular weight distributions. In particular, the polyols have polydispersities (Mw/Mn) less than about 1.5. (Mn is the number average molecular weight, and Mw is the weight average molecular weight; both are conveniently determined by well-known gel permeation chromatography methods.) Preferred polyols have Mw/Mn values less than about 1.4; more preferred are polyols having Mw/Mn values less than about 1.2. Such narrow molecular weight distributions are needed to give prepolymers with viscosities low enough to process effectively in the chain extension reaction to make elastomers. In contrast, commercial polytetramethylene ether glycols and polyester polyols generally have Mw/Mn values within the range of about 1.7 to 2.5.

Preferred polyols have equivalent weights within the range of about 750 to about 10,000. A more preferred range is from about 1000 to about 5000; most preferred is the range from about 1000 to about 4000. Minor proportions of lower molecular weight diols or triols, preferably less than about 40 weight percent, can be included with the polyol if desired to modify elastomer processing or physical properties.

The polyols preferably have a nominal hydroxyl functionality within the range of about 2 to about 6; a more preferred range is from about 2 to about 3.

Particularly preferred are polyether diols that have an actual hydroxyl functionality close to 2. The actual hydroxyl functionality of polyether diols usually varies and often depends on the nature the catalyst used to make the diol. While a polyether diol made by conventional KOH catalysis typically has an actual hydroxyl functionality of only about 1.6 or 1.7, one made via DMC catalysis may have an actual hydroxyl functionality very close to 2.

Preferred polyols for use in the process of the invention also have low unsaturation. In particular, preferred polyols have unsaturations less than about 0.02 meq/g, more preferably less than about 0.01 meq/g, and most preferably less than about 0.007 meq/g. These polyols can be made by various known methods, including DMC catalysis as described in U.S. Pat. Nos. 5,158,922, 5,470,813, and 5,482,908, the teachings of which are incorporated herein by reference. Elastomers made according to the process of the invention with polyols of low unsaturation generally have better tear strength, higher resilience, and far better tensile strength compared with elastomers based on polyols having unsaturation levels greater than about 0.02 meq/g (see Table 4 below).

The prepolymer is made by reacting the aromatic diisocyanate and the polyol at an NCO/OH ratio within the range of about 1.3 to about 3.0. A more preferred range is from about 1.5 to about 2.0; most preferred is the range from about 1.5 to about 1.8. This NCO/OH ratio is relatively high. Compare, for example, U.S. Pat. No. 5,646,230, which teaches to make prepolymers (from polyols, aromatic diisocyanates, and aliphatic diisocyanates) in one step using an aromatic diisocyanate to polyol ratio of about 1.0. By using such a high proportion of aromatic diisocyanate, we found that we could better control the viscosity of the resulting prepolymer, which will have a much lower molecular weight than a similar prepolymer made with an NCO/OH ratio that approaches 1. The high proportion of aromatic diisocyanate is also a cost advantage because less of the more-expensive aliphatic diisocyanate can be used.

Generally, the more preferred ranges for the NCO/OH ratio will depend on the nature of the polyol and aromatic diisocyanate. For example, when TDI-80 is used, the NCO/OH ratio used is preferably less than 1.7 because higher ratios may not always give a clear product. On the other hand (as Table 10, Example 31 shows), clear elastomers can be made even at an NCO/OH ratio of 3.0 if with the right choice of aromatic diisocyanate and polyol. Generally, prepolymers made at NCO/OH ratios of less than about 1.3 are not suitable for use in the invention because their molecular weights and viscosities are too high for successful elastomer processing. At NCO/OH ratios greater than 3.0, prepolymer viscosities are low enough, but the resulting elastomers are usually hazy.

While the prepolymer can be made at any desired temperature, it is generally preferred to react the polyol and the aromatic diisocyanate at a temperature within the range of about 40° C. to about 120° C.; a more preferred range is from about 60° C. to about 100° C.; most preferred is the range from about 70° C. to about 90° C.

It is often desirable to use a catalyst in making the prepolymer, although no catalyst is required. When a catalyst is used, it is preferably an organometallic catalyst, such as, for example, an organometallic tin, lead, iron, bismuth, or mercury compound. Organotin compounds such as dibutyltin dilaurate are preferred. Delayed-action catalysts can also be used. Other suitable catalysts are described in U.S. Pat. No. 5,646,230, the teachings of which are incorporated herein by reference. When a catalyst is used, it is typically used in an amount within the range of about 25 to about 1000 ppm.

The isocyanate-terminated prepolymer made in the first step is mixed, by any suitable method (e.g., mechanical stirring), with an aliphatic diisocyanate to form a prepolymer/aliphatic diisocyanate mixture. The value of making this simple mixture cannot be underestimated; the mixture has significantly lower reactivity with the aromatic diamine chain extender compared with the prepolymer alone, and this is a key to getting adequate potlife and good processability in making the elastomers.

The prepolymer/aliphatic diisocyanate mixture has a wt. % NCO content within the range of about 2 to about 13 wt. %, more preferably within the range of about 3 to about 10 wt. %. Brittle products can result when the mixture used has a wt. % NCO content greater than 13 wt. % (see Comparative Example 8). At wt. % NCO contents less than 2, the mixture viscosity can be too high for good processability.

The aliphatic diisocyanate and prepolymer are usually mixed at about the same the temperature used to make the prepolymer. Thus, they are combined at a temperature within the range of about 40° C. to about 120° C.; a more preferred range is from about 60° C. to about 100° C.; most preferred is the range from about 70° C. to about 90° C. It is usually preferred to heat this mixture under vacuum to remove any entrapped gases.

The prepolymer/aliphatic diisocyanate mixtures prepared according to the process of the invention have low viscosities. Preferably, the mixtures have Brookfield viscosities less than about 5000 cps at 80° C., more preferably less than about 3000 cps at 80° C., most preferably less than about 1000 cps at 80° C. At such low viscosities, the prepolymer/aliphatic diisocyanate mixtures blend easily with the aromatic diamine chain extenders.

Aliphatic diisocyanates suitable for use in the invention are also well known. Examples include hydrogenated MDIs (e.g., $H_{12}$MDI), isophorone diisocyanate (IPDI), tetramethylxylene diisocyanates (e.g., m-TMXDI), and the like, and mixtures thereof. Other suitable aliphatic diisocyanates are described in U.S. Pat. Nos. 5,646,230 and 3,997,514, the teachings of which are incorporated herein by reference. IPDI, m-TMXDI, and $H_{12}$MDI are preferred.

In the third step, the prepolymer/aliphatic diisocyanate mixture reacts with an aromatic diamine chain extender in an amount and manner effective to produce a clear polyurethane/urea elastomer. Usually, the aromatic diamine is added in liquid form to the well-stirred and degassed mixture of prepolymer and aliphatic diisocyanate. The processing temperature is preferably within the range of about 40° C. to about 100° C., more preferably from about 50° C. to about 90° C. The reaction mixture is then usually poured into a pre-heated mold and is heated until the elastomer cures. The elastomer is removed from the mold, preferably within 3 to 10 minutes of pouring, and is post-cured, if desired, by heating it in an oven for several hours (typically overnight). Preferably, the potlife of the elastomer (i.e., the maximum time the formulator has to fill the mold with the reaction mixture after adding the aromatic diamine to the prepolymer/aliphatic diisocyanate mixture) is at least about 20 seconds, more preferably at least about 30 seconds. If the potlife is less than 20 seconds, there is usually inadequate time to mix the components and fill the mold before the part cures, particularly for intricate parts such as in-line skate wheels.

Aromatic diamines suitable for use are well known in the polyurethane elastomer art. Sterically hindered aromatic diamines are preferred. Suitable aromatic diamines include, for example, diethyltoluene diamines, dimethylthiotoluene diamines, and the like, and mixtures thereof. Other suitable examples are described in U.S. Pat. Nos. 5,646,230, 4,146,688, and 4,631,298, the teachings of which are incorporated herein by reference. Particularly preferred are DETDA, which is an isomer mixture containing mostly 3,5-diethyl-2,4-toluenediamine and 3,5-diethyl-2,6-toluenediamine, and DMTTDA, which is an isomer mixture containing mostly 3,5-dimethylthio-2,4-toluenediamine and 3,5-dimethylthio-2,6-toluenediamine. Both are commercially available from Albemarle Corporation as ETHACURE 100 and ETHACURE 300, respectively. DETDA is has the right degree of reactivity with the prepolymer/aliphatic diisocyanate mixture for fast elastomer processing (and machine casting), while DMTTDA reacts more slowly and is usually better for hand casting.

It is also preferred to use an aromatic diamine that has relatively low color. A low-color diamine will tend to give low-color elastomers. Water-white wheels (i.e., clear and colorless wheels)—again for purely aesthetic reasons—are in demand. Preferably, the aromatic diamine will have a color less than #7, more preferably less than #3, on the Gardner scale. Low-color aromatic diamines are available commercially; alternatively, aromatic diamines with higher color can be decolorized by conventional means (distillation, carbon treatment, addition of reducing agents, or the like).

The amount of aromatic diamine used is preferably adjusted to give an NCO/NH ratio within the range of about 0.9 to about 1.2, preferably from about 1.0 to about 1.1, and most preferably from about 1.03 to about 1.10. Generally, the amount of aromatic diamine used will depend on the % NCO content of the prepolymer/aliphatic diisocyanate mixture. Usually, however, the aromatic diamine is used in an amount within the range of about 5 to about 30 wt. %. A more preferred range is from about 7 to about 20 wt. %.

Optionally, the elastomers contain one or more compounding ingredients commonly used in the art. For example, antioxidants, plasticizers, UV stabilizers, adhesion promoters, mold-release agents, fillers, dyes, and the like can be used. Generally, the compounding ingredients, when used, comprise less than about 75 wt. % of the elastomer.

Elastomers made by the process of the invention are clear. By "clear," we mean that a person can easily read newsprint through the 4" length of a 4"×1"×1" sample, and the sample appears clear even through the 4" thickness. While it is easy to make opaque elastomeric products, making clear elastomers with the dynamic property requirements of high-performance polyurethane elastomers is much more challenging. We surprisingly found that the process of the invention offers clarity without sacrificing important elastomer properties such as resilience.

Until now, making clear elastomers with excellent resilience has often meant settling for Shore hardnesses of 80A or below using higher-cost systems. With the process of the invention, however, Shore hardnesses of greater than 75A are typical, and Shore hardnesses up to 40–45D (=90A) can be easily made; even 60D is within reach (see Example 23). On the other hand, elastomers with Shore hardnesses in the range of 60A to 70A can also be made (see Example 28), and even lower hardnesses are possible if a plasticizer is included.

Elastomers made by the process of the invention are also highly resilient. Rebound % values greater than 55% are typical. Preferably, the elastomers have rebound % values greater than 60%; more preferably, the rebound % values are greater than 65%. Prior-art processes, such as the one-step method described in U.S. Pat. No. 5,646,230, give elastomers with, at best, rebound % values of only about 50% (see Tables 2b and 4b of the reference).

Another important advantage of the process of the invention is that it can be used with exclusively TSCA-listed materials. The Toxic Substances Control Act of 1976 (TSCA) gives the EPA power to control the manufacturing, importing, distribution, and processing of new chemical substances. TSCA-listed materials are those that the EPA considers safe to make and use. The prepolymer, aliphatic diisocyanate, and aromatic diamine components used in the process of the invention can all be selected from TSCA-listed materials.

Finally, the invention offers a high-performance elastomer at low cost. Because a variety of polyols are suitable, formulators are not locked into using relatively expensive PTMEGs or polyester polyols. As explained above, the ability to use a high proportion of aromatic diisocyanate reduces the amount of aliphatic diisocyanate needed and reduces the total cost of the isocyanate component. Moreover, because the invention uses readily available materials and equipment, high-performance elastomers do not have to cost a fortune.

The following examples merely illustrate the invention. Those skilled in the art will recognize many variations that are within the spirit of the invention and scope of the claims.

KEY TO THE MATERIALS

50% 4,4'-MDI: Commercially available from Bayer Corporation as MONDUR ML, this product is a mixture of isomers of diphenylmethane diisocyanate that contains about 50 wt. % of the 4,4'-isomer and about 50 wt. % of other isomers.

100% 4.4'-MDI: Diphenylmethane diisocyanate containing essentially all 4,4'-isomer.

TDI-80: A mixture of 2,4-toluene diisocyanate (80 wt. %) and 2,6-toluene diisocyanate (20 wt. %).

TDI-100: pure 2,4-toluene diisocyanate (about 100%).

IPDI: isophorone diisocyanate.

$H_{12}$MDI: an isomer mixture of dicyclohexylmethane-4,4'-diisocyanate.

m-TMXDI: m-tetramethylxylene diisocyanate.

Polyol A: A 2000 mol. wt. (hydroxyl number=56 mg KOH/g) propylene glycol-started, propylene oxide-based polyether diol; unsaturation: 0.03 meq/g.

Polyol B: A 2000 mol. wt. (hydroxyl number=56) propylene glycol-started, propylene oxide-based polyether diol; unsaturation: 0.005 meq/g.

Polyol C: A 4000 mol. wt. (hydroxyl number=28) propylene glycol-started, propylene oxide-based polyether diol; unsaturation: 0.005 meq/g.

Polyol D: A 3000 mol. wt. (hydroxyl number=37) propylene glycol-started, propylene oxide-based polyether diol containing about 10 wt. % of random, internal oxyethylene moieties; unsaturation: 0.003 meq/g.

Polyol E: A 3000 mol. wt. (hydroxyl number =37) propylene glycol-started, propylene oxide-based polyether diol containing about 20 wt. % of random, internal oxyethylene moieties; unsaturation: 0.003 meq/g.

Polyol F: A 3200 mol. wt. (hydroxyl number=35) propylene glycol-started, propylene oxide-based polyether diol having a total oxyethylene content of about 20 wt. %. The diol contains about 5 wt. % of random internal oxyethylene moieties and has a 45/55 EO/PO tip containing about 15 wt. % of oxyethylene units, for a total oxyethylene content of about 20 wt. %; unsaturation: 0.004 meq/g.

Polyol G: A 4000 mol. wt. (hydroxyl number=28) propylene glycol-started, propylene oxide-based polyether diol having a total oxyethylene content of about 20 wt. %. The diol contains about 5 wt. % of random internal oxyethylene moieties and has a 45/55 EO/PO tip containing about 15 wt. % of oxyethylene units, for a total oxyethylene content of about 20 wt. %; unsaturation: 0.004 meq/g.

Polyol H: A 2250 mol. wt. (hydroxyl number=50) propylene glycol-started, ethylene oxide-capped, propylene oxide-based polyether diol having a total oxyethylene content of about 25 wt. %; unsaturation: 0.005 meq/g.

Polyol I: A 4000 mol. wt. (hydroxyl number=28) propylene glycol-started, ethylene oxide-capped, propylene oxide-based polyether diol having a total oxyethylene content of about 20 wt. %; unsaturation: 0.005 meq/g.

Polyol J: A 4000 mol. wt. (hydroxyl number=28) propylene glycol-started propylene oxide-based polyether diol; unsaturation: 0.015 meq/g.

Polyol K: A 6200 mol. wt. (hydroxyl number=27) glycerin-started, ethylene oxide-capped, propylene oxide-based polyether triol having a total oxyethylene content of about 15 wt. %; unsaturation: 0.08 meq/g.

Polyol L: A 2000 mol. wt. (hydroxyl number=56) propylene glycol-started, ethylene oxide-capped, propylene oxide-based polyether diol having a total oxyethylene content of about 45 wt. %; unsaturation: 0.02 meq/g.

Comparative Polyol 1 (CP-1): A 4000 mol. wt. (hydroxyl number=28) propylene glycol-started, propylene oxide-based polyether diol; unsaturation: 0.08 meq/g.

Comparative Polyol 2 (CP-2): A 2000 mol. wt. (hydroxyl number=56) polytetramethylene ether glycol. Commercially available from QO Chemicals as POLYMEG 2000.

Comparative Polyol 3 (CP-3): A 2000 mol. wt. (hydroxyl number=56) polybutylene adipate diol. Commercially available from Bayer Corporation as DESMOPHEN 2502.

Comparative Polyol 4 (CP-4): A 1000 mol. wt. (hydroxyl number=112) propylene glycol-started, propylene oxide-based polyether diol; unsaturation: 0.01 meq/g.

DETDA: An isomer mixture containing mostly 3,5-diethyl-2,4-toluenediamine and 3,5-diethyl-2,6-toluenediamine. Commercially available from Albemarle Corporation as ETHACURE 100.

DMTTDA: An isomer mixture containing mostly 3,5-dimethylthio-2,4-toluenediamine and 3,5-dimethylthio-2,6-toluenediamine. Commercially available from Albemarle Corporation as ETHACURE 300.

EXAMPLE 1

Preparation of Clear Polyurethane/Urea Elastomers

Step 1: Polyol C (416 g) and 50% 4,4'-MDI (47.5 g) are charged to a one-liter, three-neck round-bottom flask equipped with thermocouple, stirrer, and nitrogen inlet. The mixture is stirred at 80° C. for 5 h. Dibutyltin dilaurate (100 ppm) is added, and the reaction continues at 80° C. for 30 min. The resulting isocyanate-terminated prepolymer has 1.40 wt. % NCO content (theoretical: 1.45 wt. %).

Step 2: Isophorone diisocyanate (IPDI) (37.0 g) is added to the prepolymer prepared in Step 1, and the mixture is heated and degassed under vacuum (80° C., <1 mm Hg) for 20 min.

Step 3: The degassed prepolymer/IPDI mixture (171 g) at 80° C. is poured into an 8-oz. jar and is then chain extended with DETDA (14.0 g) at room temperature using an NCO/NH ratio of 1.06. The mixture is stirred thoroughly for about 15 s, and is quickly cast into an open, preheated (100° C.) block mold. The elastomer is cured at 100° C. in a vented oven. The elastomers (4"×4"×1") are demolded within 5 min. and have excellent green strength. The elastomer samples are clear and have a rebound of 59%.

COMPARATIVE EXAMPLE 1

Step 1: Polyol C (416 g), 50% 4,4'-MDI (47.5 g), and isophorone diisocyanate (37.0 g) are charged to a one-liter, three-neck round-bottom flask equipped as in Example 1. The mixture is heated with stirring at 80° C. for 5 h. Dibutyltin dilaurate (100 ppm) is added, and heating continues at 80° C. for 30 min. The resulting completely reacted isocyanate-terminated prepolymer has 3.97 wt. % NCO (theoretical value: 4.18 wt. % NCO).

Step 2: The prepolymer is heated and degassed under vacuum (80° C., <1 mm Hg) for 20 min. The degassed prepolymer (171 g) at 80° C. is poured into an 8-oz. jar and is then chain extended with DETDA (13.8 g) at room temperature using an NCO/NH ratio of 1.05. The mixture is stirred thoroughly for about 15 s, and is quickly cast into an open, preheated (100° C.) block mold. The elastomer is cured at 100° C. in a vented oven. The elastomers (4"×4"×1") are demolded within 5 min. and have excellent green strength. The elastomer samples are hazy.

EXAMPLES 2–3

The procedure of Example 1 is followed, except that Polyols G and I are used instead of Polyol C. The resulting elastomers are clear and have good rebound properties (see Table 1).

EXAMPLES 3–6 and COMPARATIVE EXAMPLE 2

Preparation of Clear Polyurethane/Urea Elastomers

The procedure of Example 1 is generally followed, but the amount of 50% 4,4'-MDI is varied to measure the effect of changing the prepolymer NCO/OH ratio. The amount of IPDI used is also varied to maintain a constant theoretical % NCO of 4.18% in the prepolymer/IPDI mixture. As Table 2 shows, elastomers made from prepolymers having NCO/OH=1.8 to 2.6 are clear.

For Comparative Example 2, the procedure of Examples 3–6 is followed, except that enough 50% 4,4'-MDI is used to give a prepolymer NCO/OH ratio=2.8. The elastomer made from this prepolymer is hazy (see Table 2).

EXAMPLES 7–8 and COMPARATIVE EXAMPLE 3

The procedure of Example 1 is generally followed, except that the overall % of 4,4'-MDI isomer used to make the prepolymer is varied from 50–80% to measure the effect of prepolymer 4,4'-MDI content on potlife. As Table 3 shows, clear elastomers with good resilience are obtained, and potlife is adequate (at least 20 seconds) within the range of 50–80% 4,4'-MDI content.

For Comparative Example 3, the procedure of Examples 7–8 is followed, except that the overall 4,4'-MDI isomer content used to make the prepolymer is 90%. While a clear elastomer having good resilience results, the potlife of this elastomer (about 15 seconds) is too short to allow casting of parts.

EXAMPLES 9–10 AND COMPARATIVE EXAMPLE 4

These examples show the impact of polyol unsaturation on elastomer properties. The procedure of Example 1 is generally followed, except that the polyols used have varying degrees of unsaturation. As Table 4 shows, even a polyol with relatively high unsaturation (0.080 meq/g) gives a clear elastomer when the process of the invention is used. However, important properties such as resilience, hardness, tear strength, and especially tensile strength improve significantly when the polyol has lower unsaturation. As Example 9 and Comparative Example 4 demonstrate, tensile strength triples when the polyol unsaturation level drops from 0.08 to 0.005 meq/g.

EXAMPLES 11–14 AND COMPARATIVE EXAMPLE 5

These examples show that the process of the invention gives clear elastomers with good resilience when TDI-80 is used to make the prepolymer. The procedure of Example 1 is generally followed, except that TDI-80 is used instead of 50% 4,4'-MDI. Table 5 summarizes the results. In Comparative Example 5, TDI-80 is used with Polyol B in the two-step process of Comparative Example 1. The resulting elastomer is hazy (see Table 5).

EXAMPLE 15 AND COMPARATIVE EXAMPLES 6–7

A prepolymer is prepared from Polyol A (Mw/Mn=1.03) and TDI-80 according to the method of Example 11. The prepolymer is combined with IPDI in the usual way. The prepolymer/IPDI mixture has a viscosity of 720 cps at 80° C. Similar prepolymers are made using Comparative Polyol 2 (CP-2) (Mw/Mn=2.54) or Comparative Polyol 3 (CP-3) (Mw/Mn=2.45). The prepolymer/IPDI mixture from CP-2 has a viscosity of 5330 cps at 80° C. The prepolymer/IPDI mixture from CP-3 has a viscosity of 5350 cps at 80° C. Elastomers are formulated as in Example 11. The results, which Table 6 summarizes, indicate that prepolymer/aliphatic diisocyanate mixtures made from polyols having a Mw/Mn greater than about 1.5 are too viscous to process effectively in the process of the invention.

EXAMPLES 16–18

The procedure of Example 1 is generally followed, except that TDI-100 is used to make the prepolymer. As Table 7 shows, the resulting elastomers are clear, and they have exceptional resilience.

EXAMPLES 19–23 AND COMPARATIVE EXAMPLE 8

The procedure of Example 1 is generally followed, except that TDI-100 is used to make the prepolymer. In addition, the amount of IPDI used is varied to measure the impact of higher % NCO content of the prepolymer/IPDI mixture on elastomer properties. As Table 8 shows, clear elastomers having good rebound properties result when the mixture % NCO content is less than about 14 wt. %. As Comparative Example 8 shows, a brittle product having poor green strength results when the mixture % NCO is 14 wt. %.

EXAMPLES 24–26

These examples show that the process of the invention applies generally to a variety of aliphatic diisocyanates. The procedure of Example 16 is generally followed with Polyol I, except that the aliphatic diisocyanate is varied from IPDI to $H_{12}$MDI or m-TMXDI. As Table 9 shows, clear elastomers with good hardness and resilience result. The less-reactive aliphatic diisocyanates ($H_{12}$MDI and m-TMXDI) give a generous potlife (100–150 seconds), which is excellent for hand casting.

EXAMPLE 27

The procedure of Example 1 is generally followed to make a clear polyurethane/urea elastomer using DMTTDA as the chain extender as follows. The prepolymer is prepared from Polyol I (129.3 g) and TDI-100 (11.2 g). The NCO/OH ratio is 2.0. The prepolymer (140.5 g) is then combined with IPDI (9.4 g) to give a prepolymer/IPDI mixture having a theoretical wt. % NCO content of 4.18. The mixture (168 g) is chain extended with DMTTDA (ETHACURE 300, product of Albemarle Corp., 17.1 g) at 80° C. The potlife is about 300 seconds. After the usual curing at 100° C., elastomer samples are removed from the oven, allowed to cool for 60 min., and are demolded. Shore hardness: 72A; rebound: 66%; appearance: clear.

EXAMPLE 28

The procedure of Example 1 is generally followed to make a clear, relatively "soft" polyurethane/urea elastomer (Shore hardness=67A) as follows. The prepolymer is prepared from Polyol I (1339 g) and TDI-100 (116 g). The NCO/OH ratio is 2.0. The prepolymer (1455 g) is then combined with IPDI (45 g) to give a prepolymer/IPDI mixture having a theoretical wt. % NCO content of 3.0 (actual: 2.9 wt. %). The mixture (174.4 g) is chain extended with DETDA (10.6 g) at 80° C. The potlife is about 105 seconds. After the usual curing at 100° C., elastomer samples are removed from the oven, allowed to cool for 10 min., and are demolded. Shore hardness: 67A; rebound: 78%; appearance: clear.

EXAMPLE 29

The procedure of Example 1 is generally followed to make a clear polyurethane/urea elastomer from a 6000 mol. wt. ethylene oxide-capped polyoxypropylene triol as follows. The prepolymer is prepared from Polyol K (427 g) and TDI-80 (31.6 g). The NCO/OH ratio is 1.8. The prepolymer (458 g) is then combined with IPDI (41.6 g) to give a prepolymer/IPDI mixture having a theoretical wt. % NCO content of 4.5 (actual: 4.3 wt. %). The mixture (170 g) is chain extended with DETDA (14.8 g) at 80° C. The potlife is about 40 seconds. After the usual curing at 100° C., elastomer samples are removed from the oven and demolded after 5 min. Shore hardness: 77A; rebound: 62%; appearance: clear.

COMPARATIVE EXAMPLE 9

This example (which is an example of the invention used for comparative purposes) shows that using a low molecular weight polyol can adversely impact elastomer resilience. The procedure of Example 1 is generally followed. The prepolymer is prepared from Polyol CP-4 (387 g) and TDI-80 (101 g). The NCO/OH ratio is 1.5. The prepolymer (488 g) is then combined with IPDI (12.3 g) to give a prepolymer/IPDI mixture having a theoretical wt. % NCO content of 4.18 (actual: 3.82 wt. %). The mixture (172 g) is chain extended with DETDA (13.2 g) at 80° C. The potlife is about 60 seconds. After the usual curing at 100° C., elastomer samples are removed from the oven and demolded after 10 min. Shore hardness: 80A; rebound: 44%; appearance: clear.

COMPARATIVE EXAMPLE 10

This example shows the effect of NCO/OH ratio on mixture viscosity. The procedure of Example 11 is followed, except that the NCO/OH ratio used is 1.20. The viscosity of the prepolymer/IPDI mixture is 10,300 cps (too viscous to process effectively). In contrast, the viscosity of the prepolymer/IPDI mixture prepared in Example 11 (NCO/OH ratio=1.50) is 800 cps. The results show that a higher NCO/OH ratio greatly enhances elastomer processability.

EXAMPLES 30–31 AND COMPARATIVE EXAMPLE 11

These examples show the effect of NCO/OH ratio on elastomer clarity using a 2000 mol. wt. EO-capped polyether diol. The procedure of Example 1 is generally followed. The prepolymer is prepared from Polyol L and 50% 4,4'-MDI (see Table 10 for amounts). The NCO/OH ratios range from 2.6 to 3.4. The prepolymer is combined with enough IPDI to give a prepolymer/IPDI mixture having a theoretical wt. % NCO content of 8.0. The mixture (160 g) is chain extended with DETDA (25.5 g) at 30° C. The potlife is about 20 seconds. After the usual curing at 100° C., elastomer samples are removed from the oven and demolded after 3 min. The samples made using an NCO/OH ratio of 2.6–3.0 are clear, while the one made at NCO/OH=3.4 is hazy. The examples show that the NCO/OH ratio used in the process of the invention is important for getting clear elastomers.

The preceding examples merely illustrate the invention; the following claims define the scope of the invention.

Table 1: Formulating Clear Elastomers with High Resilience
Examples 1–3
Step 1. NCO-terminated Prepolymer from 50% 4,4'-MDI
  50% 4,4'-MDI (g): 47
  Polyol (g): 416
  % NCO/OH: 1.8
Step 2. Mixture of PrePolymer and IPDI (Mixture Z)
  Prepolymer (g): 463
  IPDI (g): 37
  NCO/OH (theoretical): 4.18
Step 3. Elastomer Formulation
  Mixture Z (g): 171
  DETDA (g): 14
  Processing temp. (° C.): 60–80
  Potlife (s): 30–35
  Demold time (min): 5
Comparative Example 1: Prepolymer (from 50% 4,4'-MDI, Polyol C, and IPDI) chain—extended with DETDA.

|      |        | Elastomer Properties |             |            |
| ---- | ------ | -------------------- | ----------- | ---------- |
| Ex # | Polyol | Shore hardness       | Rebound (%) | Appearance |
| 1    | C      | 81A                  | 59          | clear      |
| C1   | C      | 78A                  | 63          | hazy       |
| 2    | G      | 78A                  | 61          | clear      |
| 3    | I      | 78A                  | 61          | clear      |

Table 2: Effect of NCO/OH Ratio of Prepolymer on Elastomer Clarity
Examples 3–6
Step 1. NCO-terminated Preolymer from 50% 4,4'-MDI and Polyol I
  50% 4,4'-MDI g: 45–70 (see below)
  Polyol I (g): 416
  NCO/OH: 1.8–2.8 (see below)
Step 2. Mixture of Preyolymer and IPDI (Mixture Z)
  Prepolymer (g): 463–485 (see below)
  IPDI (g): 15–37 (see below)

% NCO (theoretical) 4.18
Step 3. Elastomer Formulation
  Mixture Z (g): 171
  DETDA (g): 14
  Processing temp. (° C.): 60
  Potlife (s): 20–30
  Demold time (min): 5
Comparative Example 2: Same as above except that the NCO-terminated Prepolymer has NCO/OH=2.8.

| | Prepolymer | | Mixture | | Elastomer |
|---|---|---|---|---|---|
| Ex # | 4,4'-MDI (g) | NCO/OH | Prepolymer (g) | IPDI (g) | Appearance |
| 3 | 45.4 | 1.8 | 463 | 37.4 | clear |
| 4 | 55.5 | 2.2 | 472 | 28.4 | clear |
| 5 | 60.5 | 2.4 | 476 | 23.9 | clear |
| 6 | 65.5 | 2.6 | 481 | 19.4 | clear |
| C2 | 70.4 | 2.8 | 485 | 15.1 | hazy |

Table 3: Effect of 4,4'-MDI Content on Potlife
Examples 3, 7, and 8:
Step 1. NCO-terminated Prepolymer from Polyol I and 50% 4.4'-MDI or mixtures of 50% 4.4'-MDI and 100% 4.4'-MDI
  Polyol I (g): 416
  50% 4,4'-MDI (g): 18–45 (see below)
  100% 4,4'-MDI (g): 0–27 (see below)
  NCO/OH: 1.7–1.8
Step 2. Mixture of Prepolymer and IPDI (Mixture Z)
  Prepolymer (g): 462
  IPDI (g): 38
  % NCO (theoretical): 4.18
Step 3. Elastomer Formulation
  Mixture Z (g): 171
  DETDA (g): 14
  Processing temp. (° C.): 60–80 (see below)
  Potlife (s): 20–30 (see below)
  Demold time (min): 5
Comparative Example 3: Same as above except that the ratio of 100% 4,4'-MDI to 50% 4,4'-MDI is increased to give 90% of 4,4'-MDI content overall.

| | Prepolymer | | | Processing | | Elastomer | | |
|---|---|---|---|---|---|---|---|---|
| Ex # | 50% 4,4'- MDI | 100% 4,4'- MDI | overall % 4,4'- MDI | Temp (° C.) | Pot- life (s) | Shore Hard- ness | Re- bound | Appear. |
| 3 | 45.4 | 0 | 50 | 60 | 30 | 78A | 61 | clear |
| 7 | 26.1 | 18.2 | 70 | 80 | 25 | 77A | 62 | clear |
| 8 | 17.7 | 26.6 | 80 | 80 | 20 | 76A | 61 | clear |
| C3 | 8.9 | 35.4 | 90 | 80 | 15* | 76A | 63 | clear |

*The potlife of this sample is too short to allow casting of parts.

Table 4: Effect of Polyol Unsaturation on Elastomer Properties
Examples 9 and 10:
Step 1. NCO-terminated Prepolymer from 50% 4,4'-MDI
  Polyol (g): 830 (see below)
  50% 4,4'-MDI (g): 105
  NCO/OH: 1.9–2.0
Step 2. Mixture of Prepolymer and IPDI (Mixture Z)
  Prepolymer (g): 935
  IPDI (g): 65
  % NCO (theoretical): 4.18
Step 3. Elastomer Formulation
  Mixture Z (g): 171
  DETDA (g): 14
  Processing temp. (° C.): 80
  Potlife (s): 30
  Demold time (min): 5
Comparative Example 4: Same as above except that the Polyol used (CP-1) has a much higher degree of unsaturation (0.08 meq/g).

| | Prepolymer | | Elastomer | | | | |
|---|---|---|---|---|---|---|---|
| Ex # | Poly- ol | Unsat. (meq/g) | Tensile str. (psi) | Tear str. (pli) | Elong. (%) | Shore Hard- ness | Re- bound (%) | Appear. |
| 9 | C | 0.005 | 3760 | 380 | 950 | 80A | 59 | clear |
| 10 | J | 0.015 | 2930 | 380 | 1230 | 78A | 58 | clear |
| C4 | CP-1 | 0.080 | 1270 | 280 | 1200 | 76A | 55 | clear |

C4 is an example of the invention used for comparative purposes.

Table 5: Formulating Clear Elastomers with High Resilience: TDI-80 Systems
Examples 11–14
1. NCO-terminated Prepolymer from Polyol and TDI-80
  Polyol (g): 414–425 (see below)
  TDI-80 (g): 35–54 (see below)
  NCO/OH: 1.50
Step 2. Mixture of Prepolymer and IPDI (Mixture Z)
  Prepolymer (g): 460–468 (see below)
  IPDI (g): 32–40 (see below)
  % NCO (theoretical): 4.18
Step 3. Elastomer Formulation
  Mixture Z (g): 171
  DETDA (g): 14
  Processing temp. (° C.): 80
  Potlife (s): 55–65
  Demold time (min): 8–9
Comparative Example 5: Prepolymer (from TDI-80, Polyol B, and IPDI) chain extended with DETDA.

| | Prepolymer | | | Mixture | | Elastomer | | |
|---|---|---|---|---|---|---|---|---|
| Ex # | Poly- ol | Amt. (g) | TDI-80 (g) | Pre- polymer (g) | IPDI (g) | Shore Hard- ness | Rebound (%) | Appear. |
| 11 | B | 414 | 54.1 | 468 | 32.2 | 79A | 60 | clear |
| C5 | B | 413 | 54.3 | 467 | 32.2 | 80A | 66 | hazy |
| 12 | H | 417 | 48.7 | 466 | 34.5 | 78A | 64 | clear |
| 13 | E | 424 | 36.9 | 461 | 39.6 | 76A | 62 | clear |
| 14 | F | 425 | 34.6 | 459 | 40.5 | 76A | 63 | clear |

Table 6: Effect of Polyol Molecular Weight Distribution on Viscosity of the Prepolymer/ Aliphatic Diisocyanate Mixture
Example 15 and Comparative Examples 6–7:
Step 1. NCO-terminated Prepolymer from Polyol and TDI-80
  Polyol (see below) (g): 414

TDI-80 (g): 54.1
NCO/OH: 1.50
Step 2. Mixture of Prepolymer and IPDI (Mixture Z)
  Prepolymer (g): 468
  IPDI (g): 32.2
  % NCO (theoretical): 4.18

| Ex # | Polyol | Mw/Mn | Prepolymer/IPDI Mixture Viscosity (cps, at 80° C.) |
|---|---|---|---|
| 15 | A | 1.03 | 720 |
| C6 | CP-2 | 2.54 | 5330 |
| C7 | CP-3 | 2.45 | 5350 |

Table 7: Formulating Clear Elastomers with High Resilience: TDI-100 Systems

Examples 16–18
Step 1. NCO-terminated Prepolymer from Polyol and TDI-100
  Polyol (g): 414–428 (see below)
  TDI-100 (g): 46–72 (see below)
  NCO/OH: 2.00
Step 2. Mixture of Prepolymer and IPDI (Mixture Z)
  Prepolymer (g): 472–486 (see below)
  IPDI (g): 14–28 (see below)
  % NCO (theoretical): 4.18–4.50 (see below)
Step 3. Elastomer Formulation
  Mixture Z (g): 171
  DETDA (g): 14
  Processing temp. (° C.): 80
  Potlife (s): 65–80
  Demold time (min): 10

| | | Prepolymer | | Mixture | | Elastomer | | |
|---|---|---|---|---|---|---|---|---|
| Ex # | Polyol | Amt. (g) | TDI-100 (g) | Pre-polymer (g) | IPDI (g) | Shore Hardness | Rebound (%) | Appear. |
| 16 | B | 414 | 72.0 | 486 | 13.7 | 80A | 67 | clear |
| 17 | D | 423 | 49.2 | 472 | 28.1 | 80A | 68 | clear |
| 18 | F | 428 | 46.4 | 474 | 25.7 | 76A | 71 | clear |

Prepolymer Exs. 16–17: % NCO = 4.50; Ex. 18: % NCO = 4.18

Table 8: Effect of Mixture % NCO Content on Elastomer Properties: TDI-100 Systems Examples 19–23
Step 1. NCO-terminated Prepolymer from Polyol H and TDI-100
  Polyol H (g): 129–168 (see below)
  TDI-100 (g): 19–25 (see below)
  NCO/OH 1.90
Step 2. Mixture of Prepolymer and IPDI (Mixture Z)
  Prepolymer (g): 148–193 (see below)
  IPDI (g): 7.2–52 (see below)
  % NCO (theoretical): 4.2–12 (see below)
Step 3. Elastomer Formulation
  Mixture Z (g): 171–149 (see below)
  DETDA (g): 14–36 (see below)
  Processing temp. (° C.): 50–80
  Potlife (s): 20–70
  Demold time (min): 5–10

Comparative Example 8: Prepared as in Examples 19–23, except that the ratio of IPDI to Prepolymer is higher, giving a Mixture with 14 wt. % NCO content.

| | Prepolymer | | | Mixture | | Elastomer | | | |
|---|---|---|---|---|---|---|---|---|---|
| Ex # | Polyol H (g) | TDI-100 (g) | Pre-pol. (g) | IPDI (g) | % NCO | Mixture Z (g) | DETDA (g) | Hard. | Reb'd (%) | Appear. |
| 19 | 168 | 24.7 | 193 | 7.2 | 4.18 | 171 | 14.4 | 79A | 72 | clear |
| 20 | 159 | 23.4 | 182 | 17.6 | 6.00 | 165 | 20.0 | 90A | 62 | clear |
| 21 | 149 | 22.0 | 171 | 29.0 | 8.00 | 159 | 25.7 | 42D | 59 | clear |
| 22 | 139 | 20.5 | 160 | 40.5 | 10.0 | 154 | 31.1 | 53D | 59 | clear |
| 23 | 129 | 19.0 | 148 | 52.1 | 12.0 | 149 | 36.1 | 61D | 59 | clear |
| C8 | 119 | 17.5 | 137 | 63.5 | 14.0 | 144 | 40.8 | * | * | clear |

*Brittle product, poor green strength; not tested.

Table 9: Clear Elastomers: TDI-100 Systems: Effect of Aliphatic Diiocyanate

Examples 24–26
Step 1. NCO-terminated Prepolymer from Polyol I and TDI-100
  Polyol I (g): 128
  TDI-100 (g): 11.1
  NCO/OH: 2.0
Step 2. Mixture of Prepolymer and IPDI (Mixture Z)
  Prepolymer (g): 140
  Aliphatic diisocyanate (g): 9–11 (see below)
  % NCO (theoretical): 4.18
Step 3. Elastomer Formulation
  Mixture Z (g): 171
  DETDA (g): 14.4
  Processing temp. (° C.): 80
  Potlife (s): 70–150 (see below)
  Demold time (min): 9–45 (see below)

| | Mixture | | Processing | | Elastomer | | |
|---|---|---|---|---|---|---|---|
| Ex # | Aliphatic Diiso-cyanate | Amt. (g) | Potlife (s) | Demold (min) | Shore Hardness | Rebound (%) | Appearance |
| 24 | IPDI | 9.4 | 70 | 9 | 77A | 68 | clear |
| 25 | $H_{12}$MDI | 11.3 | 100 | 10 | 82A | 67 | clear |
| 26 | m-TMXDI | 10.4 | 150 | 45 | 76A | 65 | clear |

Table 10: Effect of NCO/OH Ratio on Elastomer Clarity

Examples 30–31 and Comparative Example 12:

Step 1. NCO-terminated Prepolymer from Polyol L and 50% 4,4'-MDI
  Polyol L (g): 340–344 (see below)
  50% 4,4'-MDI (g): 112–145 (see below)
  NCO/OH: 2.6–3.4 (see below)

Step 2. Mixture of Prepolymer and IPDI (Mixture Z)
  Prepolymer (g): 455–485 (see below)
  IPDI (g): 15–45 (see below)
  % NCO (theoretical): 8.0

Step 3. Elastomer Formulation
  Mixture Z (g): 160
  DETDA (g): 25.5
  Processing temp. (° C.): 30
  Potlife (s): 20
  Demold time (min): 3

| | Prepolymer | | | Mixture | | |
|---|---|---|---|---|---|---|
| Ex # | Polyol L (g) | 50% 4,4'-MDI (g) | NCO/OH | Prepolymer (g) | IPDI (g) | Elastomer Appearance |
| 30 | 344 | 112 | 2.6 | 455 | 44.7 | clear |
| 31 | 342 | 128 | 3.0 | 470 | 29.9 | clear |
| C12 | 340 | 145 | 3.4 | 485 | 15.1 | hazy |

We claim:

1. A process which comprises:
   (a) reacting an aromatic diisocyanate with a polyol having a polydispersity (Mw/Mn) less than 1.5 to produce an isocyanate-terminated prepolymer, wherein the NCO/OH mole ratio is within the range of about 1.3 to about 3.0;
   (b) mixing the prepolymer with an aliphatic diisocyanate to form a prepolymer/aliphatic diisocyanate mixture that has an NCO content within the range of about 2 to about 13 wt. %; and
   (c) reacting the prepolymer/aliphatic diisocyanate mixture with an aromatic diamine in an amount and manner effective to produce a clear polyurethane/urea elastomer.

2. The process of claim 1 wherein the aromatic diisocyanate is selected from the group consisting of toluene diisocyanates and MDIs that contain at least about 15 wt. % of MDI isomers other than 4,4'-MDI.

3. The process of claim 1 wherein the aromatic diisocyanate comprises less than 90 wt. % of 4,4'-MDI.

4. The process of claim 1 wherein the polyol has an Mw/Mn of less than 1.4.

5. The process of claim 1 wherein the polyol has an Mw/Mn of less than 1.2.

6. The process of claim 1 wherein the polyol has an unsaturation less than 0.02 meq/g.

7. The process of claim 1 wherein the polyol has an unsaturation less than 0.01 meq/g.

8. The process of claim 1 wherein the polyol has an equivalent weight within the range of about 750 to about 10,000.

9. The process of claim 1 wherein the prepolymer is made at an NCO/OH ratio within the range of about 1.5 to about 2.0.

10. The process of claim 1 wherein the prepolymer is made at an NCO/OH ratio within the range of about 1.5 to about 1.8.

11. The process of claim 1 wherein the prepolymer/aliphatic diisocyanate mixture has a viscosity less than about 5000 cps at 80° C.

12. The process of claim 1 wherein the prepolymer/aliphatic diisocyanate mixture has a viscosity less than about 3000 cps at 80° C.

13. The process of claim 1 wherein the aliphatic diisocyanate is selected from the group consisting of hydrogenated MDIs, isophorone diisocyanate, tetramethylxylene diisocyanates (TMXDIs), and mixtures thereof.

14. The process of claim 1 wherein the NCO content of the prepolymer/aliphatic diisocyanate mixture is within the range of about 3 to about 10 wt. %.

15. The process of claim 1 wherein the aromatic diamine is selected from the group consisting of diethyltoluenediamines (DETDA), dimethylthiotoluene diamines (DMTTDA), and mixtures thereof.

16. The process of claim 1 wherein the aromatic diamine is used at an NCO/NH ratio within the range of about 0.9 to about 1.2.

17. The process of claim 1 wherein the aromatic diamine has a Gardner color less than or equal to 7.

18. The process of claim 1 wherein the aromatic diamine has a Gardner color less than or equal to 3.

19. The process of claim 1 wherein the step (c) reaction has a potlife of at least about 20 seconds.

20. The process of claim 1 wherein the elastomer produced has a Shore hardness of at least about 75A.

21. The process of claim 1 wherein the elastomer produced has a resilience of at least about 55%.

22. The process of claim 1 wherein the elastomer produced has a resilience of at least about 65%.

23. A polyurethane/urea elastomer made by the process of claim 1.

24. An in-line skate or skateboard wheel fabricated from the elastomer of claim 23.

25. A process which comprises:
   (a) reacting an aromatic diisocyanate with a polyether diol having a polydispersity (Mw/Mn) less than 1.2 and an unsaturation less than 0.007 meq/g to produce an isocyanate-terminated prepolymer, wherein the NCO/OH mole ratio is within the range of about 1.5 to about 1.8;
   (b) mixing the prepolymer with an aliphatic diisocyanate selected from the group consisting of hydrogenated MDIs, isophorone diisocyanate, tetramethylxylene diisocyanates (TMXDIs), and mixtures thereof to form a prepolymer/aliphatic diisocyanate mixture that has an NCO content within the range of about 3 to about 10 wt. %; and
   (c) reacting the prepolymer/aliphatic diisocyanate mixture with an aromatic diamine selected from the group consisting of diethyltoluenediamines (DETDA), dimethylthiotoluene diamines (DMTTDA), and mixtures thereof in an amount and manner effective to produce a clear polyurethane/urea elastomer.

26. A polyurethane/urea elastomer made by the process of claim 25.

27. An in-line skate or skateboard wheel fabricated from the elastomer of claim 26.

* * * * *